Feb. 7, 1933.  F. DAVIS  1,896,863

WELDED PRESSURE VESSEL

Filed June 25, 1931

Inventor:
Fred Davis,
by Charles E. Tuella
His Attorney.

Patented Feb. 7, 1933

1,896,863

UNITED STATES PATENT OFFICE

FRED DAVIS, OF SAUGUS, MASSACHUSETTS, ASSIGNOR TO GENERAL ELECTRIC COMPANY, A CORPORATION OF NEW YORK

WELDED PRESSURE VESSEL

Application filed June 25, 1931. Serial No. 546,845.

My invention relates to welded tanks and vessels and particularly to pressure tanks and vessels such as are used for gas tanks, steam boilers, oil stills, etc.

Pressure tanks and vessels of the above description have heretofore been made for the most part by riveting and/or forge welding, but the constructions employed have not been particularly suited for gas or arc welding. When gas and arc welding have been employed for fabricating such vessels, the particular constructions used have not been such as to produce a tank that is safe, strong and dependable.

It is an object of my invention to provide an improved construction by means of which strongly constructed vessels which are both safe and dependable may be made by gas or arc welding.

It is a further object of my invention to provide an improved construction for welded pressure vessels in which the several parts are so proportioned and arranged that the welded unions between the same are adequately reinforced by the mechanical construction employed.

My invention will be better understood from the following description taken in connection with the accompanying drawing which illustrates one particular embodiment of my invention.

Figure 1:
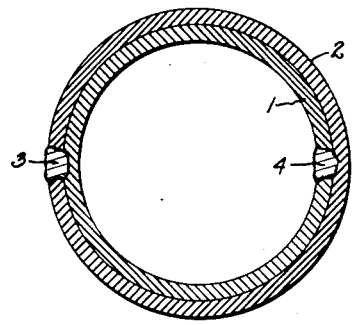
Figure 2:
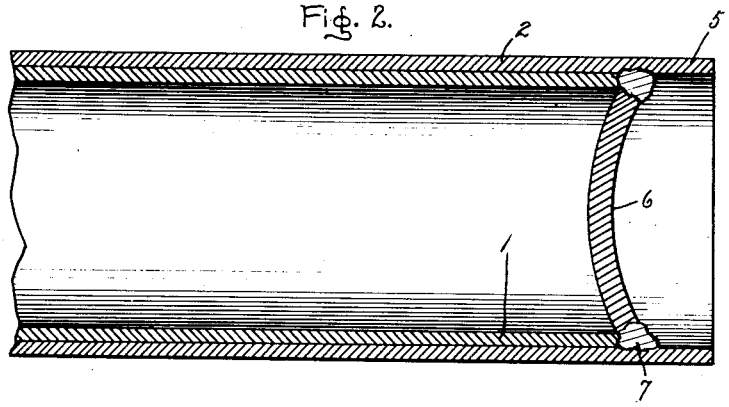

In the drawing Fig. 1 is a sectional view of a pressure vessel constructed in accordance with my invention; Fig. 2 is a sectional view of the end of a vessel showing the method of making the same, and Fig. 3 is a sectional view of the end of a vessel showing the completed construction.

The pressure vessel shown in the drawing comprises a drum or shell portion headed or enclosed at its ends by disks which are welded to the sheets of material forming the shell or drum. The vessel comprises inner and outer layers of sheets 1 and 2 closed upon themselves to form a drum. It will be noted by referring to Fig. 1 of the drawing that the joints between sheets in one layer are offset from those between sheets of another layer and that the welds between the sheets in one layer extend into the surface of the adjoining sheets in the next layer thereby uniting the several sheets to one another to form a strongly constructed shell or drum. In the particular construction shown in the drawing the shell is made up to two sheets which are closed upon themselves to form superposed cylinders, the edges of one sheet being welded to one another and to the surface of the superposed sheet at diametrically opposite points 3 and 4.

Figure 3:
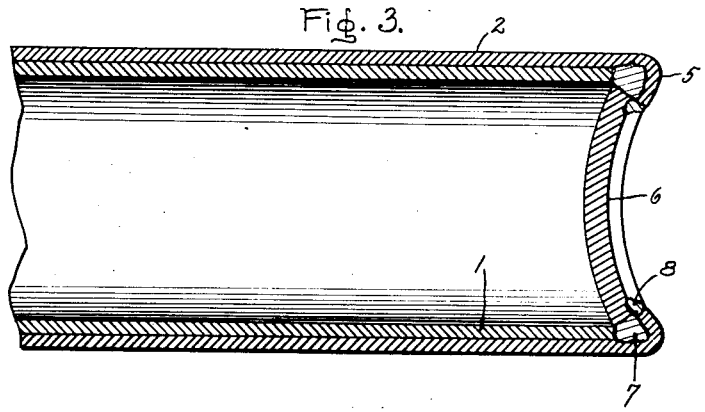

As will be noted from the finished construction shown in Fig. 3, the outer or reinforcing shell 2 is provided with end portions 5 extending beyond and inturned over a disk 6 which is set inside of the outer shell 2 and against the end portions of the inner shell 1. The edge portions of this disk are attached to the ends of the inner shell 1 and the adjacent inside portion of the outer shell 2 by a weld 7. The edge of the inturned portions 5 of the outer shell is also attached to disk 6 by a weld 8. The inturned portion 5 of the outer shell thus mechanically reinforces the weld 7 between the inner and outer shells 1 and 2 and the disk 6. The manner of forming the shell or drum of the tank above described in which the joints in one layer are offset from those between sheets in another layer and joined to one another by welds which extend from one layer into the next layer also produces a mechanical reinforcement of each weld which adds greatly to the strength and dependability of the welded vessel thus produced.

The method of welding the tank is as follows: The sheets forming the inner and outer shells of the drum are closed upon themselves to form cylinders which are telescoped and welded as shown in Fig. 1. Weld 3 unites the edges of the sheets forming the outer shell 2 and also extends into the adjoining surface portion of the sheets forming the inner shell 1, the edge portions of which are joined by a weld 4 which extends into the adjoining portion of the sheets of the outer shell 2. These welds may be made by gas welding or arc welding. Preferably additional material is supplied to the weld during the welding operation by using a filler rod for gas or carbon arc welding, or by performing the welding operation by means of metallic arc welding in which process a metallic electrode is fused and incorporated in the weld.

The outer cylinder or shell 2 is made slightly longer than the inner cylinder or shell 1 so as to provide extending edge portions 5, as shown in Fig. 2. The cylinders are headed by disks 6 which are set inside of the outer cylinder or shell 2 against the end portions of the inner cylinder or shell, and the several parts are integrally united by means of a weld 7. The end portion 5 of the outer shell is then bent down over the weld 7, and the edges of these inturned portions then united to the surface of the disks 6 by welds 8.

The disks 6 may be flat or dished. In the drawing they have been shown as dished with their convex surfaces turned inward and, although this construction is preferred, my invention is not limited to enclosing disks of the construction illustrated since flat disks or dished disks with their convex surfaces turned outwardly may be employed without departing from my invention. The disks 6 are preferably of substantially the same thickness as the combined thickness of the plates in the shell or drum of the pressure vessel.

Although in the particular configuration illustrated in the drawing the shell or drum of the pressure vessel is formed of but two layers of sheets, my invention is not limited to this construction, since more than two layers of sheets may be employed in fabricating the shell or drum of a pressure vessel in accordance with my invention. Furthermore, the construction employed is not of necessity limited to cylindrical vessels such as illustrated, although for vessels subjected to high pressure, this construction would be the most desirable one to employ. The construction likewise is not limited to closed vessels since the same welded construction between drum and head or end closure may be employed for open vessels.

Thus, while I have shown and particularly described one embodiment of my invention for the purpose of explaining its principles and illustrating its application, various modifications and arrangements in accordance with my invention will readily present themselves to those skilled in the art and I therefore wish to cover by the appended claims all modifications within the true spirit and scope of my invention.

What I claim as new and desire to secure by Letters Patent of the United States, is:

1. A pressure vessel comprising a shell headed at each end by disks, welds between the edges of said disks and the ends of said shell, a reinforcing shell for said first-mentioned shell having end portions inturned over said welds, and welds between said disks and the edges of the inturned end portions of said reinforcing shell.

2. A pressure vessel comprising a plurality of superposed shells headed by disks having substantially the same thickness as the combined thickness of said shells, said disks being set inside an outer shell, the end portions of which are inturned over said disks, and against the edge portions of an inner shell, welds between the edges of said disks, the end portions of said inner shell and the adjacent inside portion of said outer shell, and welds between the edges of the inturned end portions of said outer shell and said disks.

3. A vessel comprising an inner shell, an end closure for said shell, an outer shell enveloping said inner shell and having end portions extending beyond and inturned toward said end closure, a weld between the edge of said end closure, the end of said inner shell and the inside wall of said outer shell adjacent thereto, and a weld between the edge portion of said inturned edge of said outer shell and said end closure.

4. A pressure vessel comprising inner and outer layers of sheets closed upon themselves to form a drum, the joints between sheets in one layer being offset by those between sheets in another layer, welds between sheets in the same layer and the adjacent sheets in the next layer, disks for heading said drum, set inside an outer layer of said sheets, the edge portions of which are inturned over said disks and against the edge portions of an inner layer of said sheets, welds between the edges of said disks, the end portions of said inner layer of drum sheets and the inside portion of said outer layer of sheets and welds between the inturned edge portions of said outer layer of sheets and said disk.

5. A vessel comprising inner and outer layers of sheets closed upon themselves to form a drum, the edges of adjoinng plates in one layer being displaced from the edges of adjoining sheets in another layer, welds between said sheets at their abutting edge portions and the surfaces of sheets in layers adjacent thereto, a disk having substantially the same thickness as the combined thickness of said sheets for closing one end of said drum, said disk being set inside an outer layer of said sheets, the edge portions of which are inturned over said disk, and against the edge portions of an inner layer of said sheets, a weld between the edges of said disk and the end portions of said inner shell and the inside portions of said outer sheets adjacent thereto, and a weld between the inturned edge portions of said outer sheets and said disk.

In witness whereof, I have hereto set my hand.

FRED DAVIS.